UNITED STATES PATENT OFFICE.

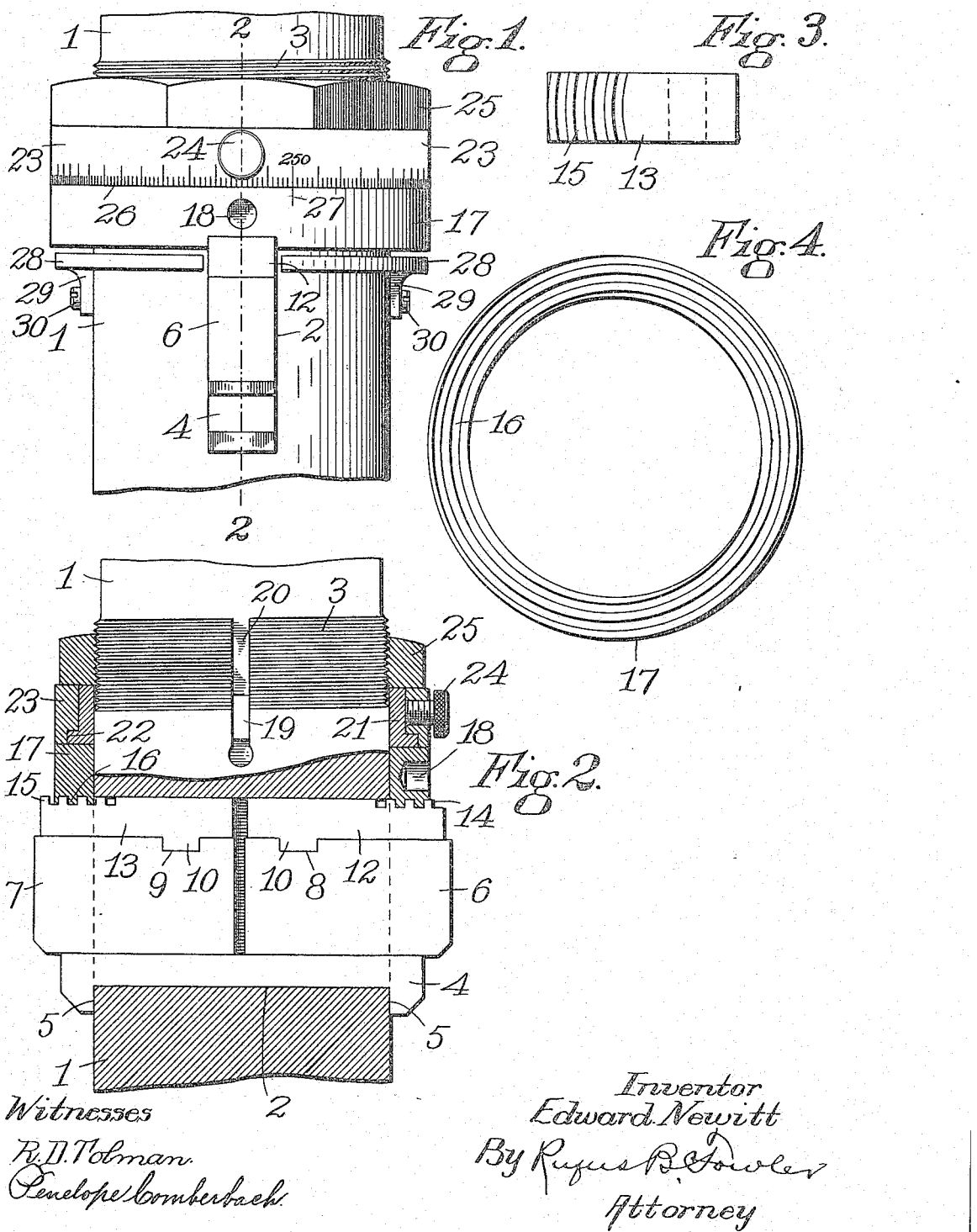

EDWARD NEWITT, OF FITCHBURG, MASSACHUSETTS.

BORING-BAR.

1,143,988.  Specification of Letters Patent.  Patented June 22, 1915.

Application filed October 21, 1911. Serial No. 656,046.

*To all whom it may concern:*

Be it known that I, EDWARD NEWITT, a citizen of the United States, residing at Fitchburg, in the county of Worcester and Commonwealth of Massachusetts, have invented a new and useful Improvement in Boring-Bars, of which the following is a specification, accompanied by drawings forming a part of the same.

My invention relates to an improvement in the boring bars such as are usually employed in connection with boring machines, milling machines, and woodworking machines, and it relates especially to a mechanism for adjusting the position of the cutter, or cutters.

In the accompanying drawings in which I have shown a portion of a boring bar containing my cutter adjusting mechanism, Figure 1 represents the side elevation of a portion of the boring bar showing that part containing the cutter and cutter adjusting mechanism. Fig. 2 is a side view of the part shown in Fig. 1 rotated a quarter turn upon a vertical axis and showing portions in vertical central sectional view. Fig. 3 is a detached top view of one of the cutter actuating bars. Fig. 4 is a bottom view of the rotatable collar engaging the cutter actuating bars.

Similar reference letters and figures refer to similar parts throughout the different views.

Referring to the drawings, 1 denotes a portion of the boring bar, provided with a diametrical hole or mortise 2 to receive the cutters, and also with a screw threaded section 3. Within the mortise 2 I insert a steel bar 4 held from longitudinal movement by the shoulders 5, 5. The bar 4 forms a bed upon which the cutters 6 and 7 are supported and upon which they are capable of sliding longitudinally. The cutters 6 and 7 are duplicates of each other and are arranged to slide out and in on the supporting bar 4 in order to vary the size of the hole to be cut.

The cutters 6 and 7 are provided on their upper edges with notches 8 and 9 which are engaged by the projecting lugs 10, 10 on the cutter actuating bars 12 and 13 supported upon the upper edges of the cutters 6 and 7. The upper edges of each outer end of the actuating bars 12 and 13 are provided with rack teeth 14 and 15 arranged upon helical lines and adapted to be engaged by the helical teeth 16 upon the under side of an annular collar 17.

The construction described above provides a ready means for the substitution of a new pair of cutters for a worn-out pair, or for the substitution of cutters of different sizes or shapes, by merely raising the collar 17, and withdrawing the bars 12 and 13 with the cutters 6 and 7 interlocked therewith, and reinserting said bars with the substituted cutters. The collar 17 is provided with one or more radial holes 18 to receive a spanner by which the collar 17 may be rotated about the boring bar by the attendant.

Splined to the boring bar by a key 19 held in a keyway 20 is a collar 21 capable of a slight longitudinal movement on the boring bar, and having its lower flanged edge 22 resting upon the collar 17. Interlocked in and inclosing the collar 21 is an outer collar 23 capable of rotating about the collar 21 and being adjustably held in any fixed position thereon by means of a set screw 24. Above the collars 21 and 23 is a polygonal nut 25 engaging the screw threaded section 3 of the boring bar. It will be seen that the collar 21, by reason of being keyed to the boring bar, is held against rotation with respect thereto, but is capable of longitudinal movement thereon when the nut 25 is loosened for the purpose of adjusting the cutters. The collar 23, carried by the collar 21, is movable therewith, and is also capable of rotation with respect thereto. The outer surface of the collar 23 is graduated, as shown at 26, Fig. 1, and the collar 17 is provided with a graduate mark 27, enabling the position of the collar 17, as it is rotated by a spanner, to be determined, and the consequent position of the cutters to be ascertained.

The operation of my cutter adjusting mechanism is as follows: When the parts are assembled as represented in the accompanying drawings the collar 17 is rotated in one direction to draw the cutters 6 and 7 inward until their inner ends contact. The cutters are then in the position for cutting the smallest hole. The set screw 24 is loosened and the graduated collar 23 is rotated until the mark 27 coincides with that mark on the collar 23 which indicates the exact diameter of the cutting surfaces of the cutters 6 and 7 or the diameter of the hole which is made by the cutters when in the above-described position of adjustment.

The set screw 24 is then tightened, and as it is desired to increase the diameter of the hole formed by the cutters 6 and 7 the collar 17 is rotated in the opposite direction, causing a separation of the cutters 6 and 7 and increasing the diameter of their cutting edges, the graduations upon the collar 23 indicating at all times the diameter of the hole formed by the cutters. In order to rotate the collar 17 for the purpose of adjusting the diameter of the cutters the nut 25 is loosened slightly and again tightened after the adjustment of the cutters has been effected, causing the cutters to be securely clamped against the bar 4 and positively held from accidental movement. The collar 21 provides a support for the collar 23 which enables said collar 23 to be moved longitudinally of the boring bar, but prevents its rotation with respect thereto from its adjusted position when the nut 25 is loosened. As the helical teeth of the actuating collar 17 are but partially covered by the teeth of the cutter actuating bars 12 and 13, I provide protection for the remaining toothed surface by attaching to the body portion of the boring bar two semiannular plates 28, 28, each extending around the bar 1 between the projecting ends of the cutter actuating bars 12 and 13. The plates 28, 28 are provided with lugs 29, 29, bearing against the sides of the bar 1 to which they are attached by screws 30, 30. The plates 28, 28 also serve as stops to prevent the actuating toothed collar 17 from sliding on the bar 1 when the cutters 6 and 7, and bars 12 and 13 are removed.

I claim—

1. The combination with a rotatable bar having a transverse opening for a cutter, a cutter held in said opening, a bar resting upon the upper surface of said cutter and detachably interlocked therewith, said bar having helically arranged teeth on its upper surface, a rotatable collar having helical teeth engaging the teeth on said bar, a collar resting on said rotatable collar and having a splined connection with said rotatable bar, adjusting means carried by said second mentioned collar, and a nut bearing on said splined collar and having a screw threaded connection with said rotatable bar.

2. The combination of a bar, a pair of cutters held therein with their ends projecting from the sides of the bar, a rotatable collar inclosing the bar and operatively connected with said cutters to impart a longitudinal movement thereto, a nonrotatable collar held upon said bar and a graduated collar adjustably held on said nonrotatable collar adjacent to said rotatable collar.

3. The combination with a rotatable bar having an opening, of cutters disposed in said opening, bars resting on said cutters and interlocked therewith, said bars having their ends projecting beyond said rotatable bar and provided with helically arranged teeth on their upper sides, a rotatable collar having helical teeth engaging the teeth of said bars, and a pair of semiannular plates attached to said rotatable bar in shielding relation to the exposed teeth of said rotatable collar.

4. The combination, with a rotatable bar having a transverse opening, of a cutter slidable within said opening and provided with a notch, a bar within said opening provided with a projection engaging the notch in said cutter, whereby to provide a detachable connection between said bar and cutter, and means for imparting movement to said bar.

5. The combination, with a rotatable bar, of a pair of cutters carried thereby, a collar rotatable on said bar for moving said cutters radially with respect thereto, and means, comprising a second collar adjustably mounted on said bar, for coöperating with said first mentioned collar to indicate the movement imparted to said cutters.

EDWARD NEWITT.

Witnesses:
  Rufus B. Fowler,
  Penelope Comberbach.

Copies of this patent may be obtained for five cents each, by addressing the "Commissioner of Patents Washington, D. C."